Feb. 17, 1942.  H. E. KOEPCKE  2,273,113
VALVE CONTROL
Filed April 26, 1941  2 Sheets-Sheet 1
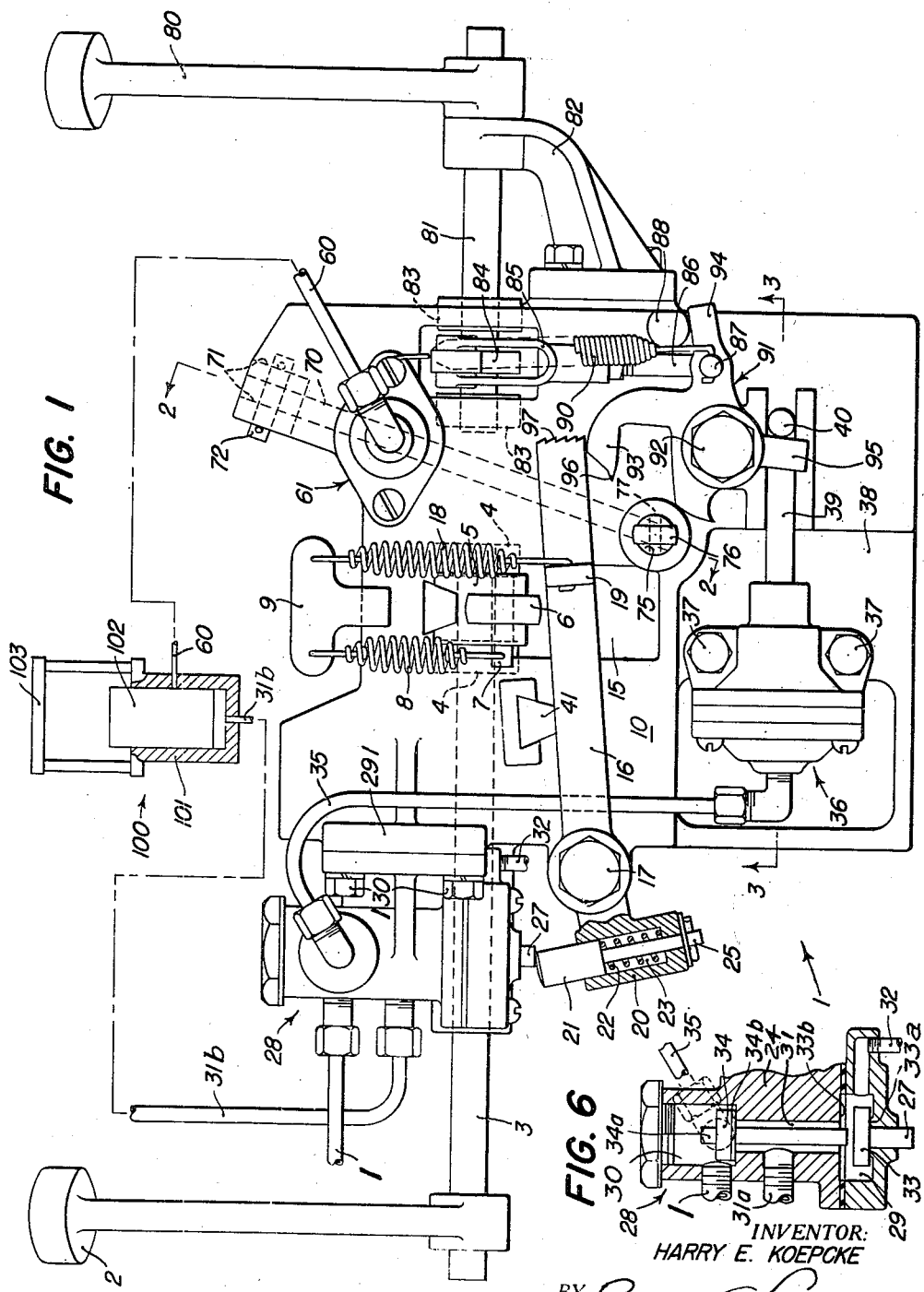
INVENTOR:
HARRY E. KOEPCKE
BY Bruno Sechler
ATTORNEYS.

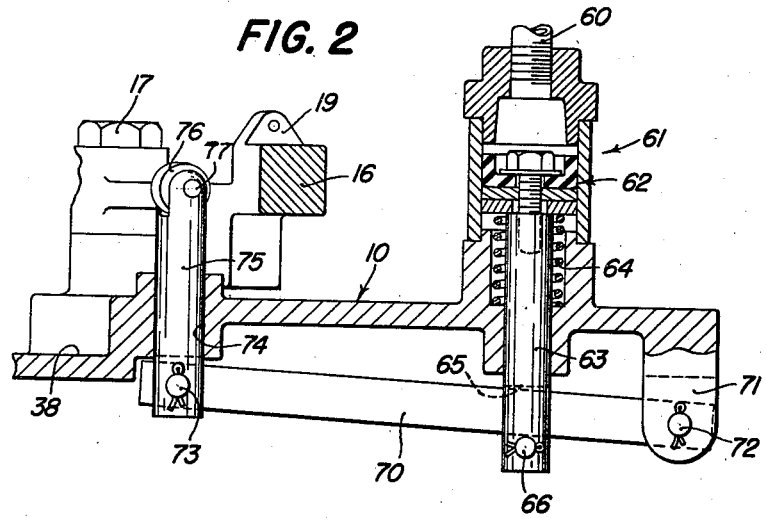
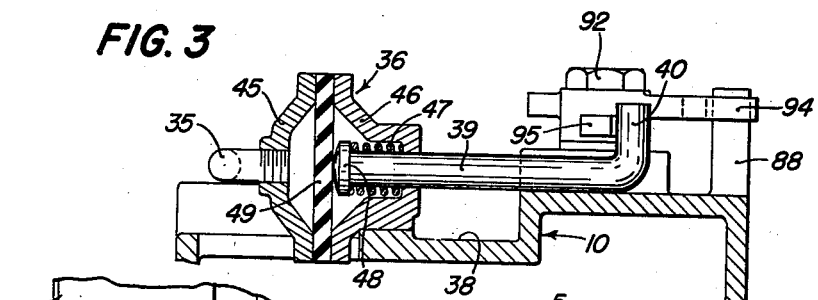
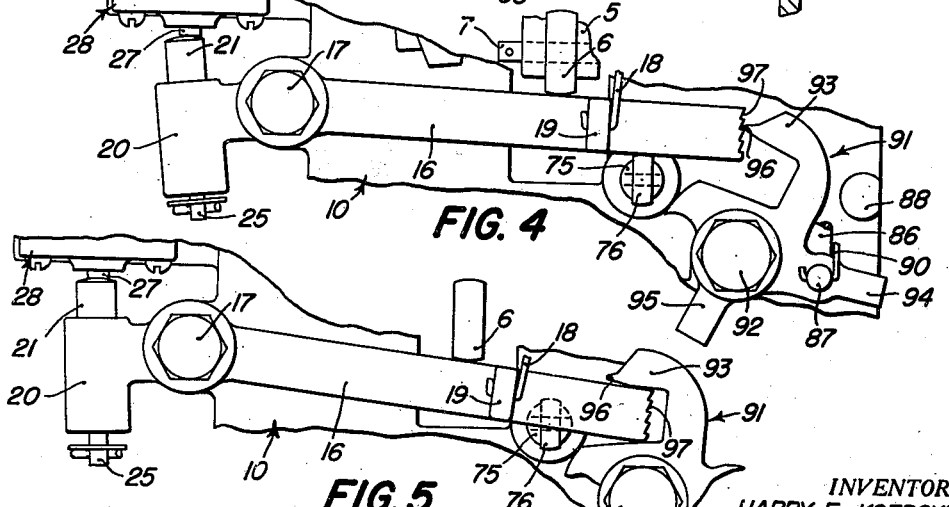

Patented Feb. 17, 1942

2,273,113

UNITED STATES PATENT OFFICE 2,273,113

VALVE CONTROL

Harry E. Koepcke, East Moline, Ill., assignor to American Machine and Metals, Inc., New York, N. Y., a corporation of Delaware Application April 26, 1941, Serial No. 390,533

10 Claims. (Cl. 192—131)

This invention relates to a control mechanism for a fluid valve.

It is an object of this invention to provide a new and improved control mechanism in which one hand may operate the valve itself but in which there is provided a lock or bolt device constructed and arranged to lock the valve against further opening movement in whatever position it may be excepting when the lock device is released by the other hand, subject, however, to complete closing release at any time that the valve controlling hand is removed excepting after the full operating movement is completed.

It is a further object to provide a control mechanism in which the locking device can lock the valve in open position even when both hands are removed from the controls but in which the lock can occur only after the operated mechanism, that is, the mechanism operated by the power controlled by the valve, has actually moved a predetermined amount in response to the initial movement of the control mechanism.

It is a further object to provide a control mechanism adapted to lock the valve in open position but having means to release the valve to close, upon failure of the power supply or after the pressure of the power supply becomes less than a predetermined amount.

It is a further object to provide a valve which may be operated by one hand and completely controlled as to speed of movement or release by said hand but which is locked against movement by means under control of the other hand, so constructed and arranged that the other hand must be employed both at the beginning and during the closing of the operated mechanism in order to release the valve operating mechanism for operation.

It is a further object to provide a valve control which may be locked or released for operation by one hand but in which the entire operating control is under the other hand.

It is a further object to provide a device of the character described having means whereby the locking of the valve in position to maintain the operated mechanism in operated position can only be accomplished after the controlled mechanism has actually moved a predetermined amount.

This valve may be employed to control the flow of fluid to any branch line in a pressure system. It is particularly well suited for the control of fluid supplied to such branch lines where upon the completion of the operation the fluid supply is to be cut off and the fluid already supplied permitted to escape from the branch line through an exhaust or the like. The valve may be operated by one hand alone. When released for operation by the other hand, this operating hand is free to vary the speed of operation, to throw the valve on or off with entire freedom as long as the safety latch controlled by the second hand is withdrawn. If the hand operating the safety latch is released from the safety latch while the operating hand is on the valve control and before the operated mechanism has actually moved its predetermined distance, the valve is held against movement in the opening direction and can be released for further movement only by again depressing the safety latch, but it will be restored to normal as soon as the valve operating control is released.

As soon, however, as the movement of the operated mechanism has moved the specified amount for which it is arranged, the release of the safety latch hand will lock the device in the operated position such as to prevent any further operation of the valve either by jarring or by accidental contact until the safety latch is manually operated to release the catch.

It has been found desirable in many operations controlled by a valve that the operator shall stand by the valve until the operation which it controls has gotten under way satisfactorily. Thus, depending upon the type of application, there may be an obstruction to the operation of the machine, a lack of material to be operated on, or there may be initial unsteadiness of operation in passing through critical speeds or any one of a number of variable factors that precede the smooth operation of the unit.

Once in satisfactory operation the valve may safely be latched down so that the operator may proceed about his other duties. In the preferred form of the invention, although the operator has complete control of supplying fluid or shutting off its supply, and latching the valve shut at any time, auxiliary means are provided which will permit a diversion of the fluid unless the latching has been delayed long enough to assure that the operation can safely be left without the attention of the operator.

The means which permit latching the valve in the open position at the end of a short interval if the operator holds both hands down is controlled by the fluid flowing through the valve itself. Accordingly, even though the valve be latched shut, should the supply of fluid fail and the proper operation of the equipment controlled by the valve thereby be endangered, this fluid controlled device will allow the valve to go back to its initial position.

This valve control is not limited to any particular application but may be used in a large variety of ways. While the control of a machine embodying a servo-type motor consisting of an air operated ram is here shown, it is only as an illustrative example of its use. Further, it is not limited to the control of air, the particular fluid selected for illustration.

In the drawings Figure 1 is an elevation of the valve control applied to a machine, generally indicated, on a small scale. Figure 2 is a section of Figure 1 on the line 2—2. Figure 3 is a section on the line 3—3 of Figure 1. Figure 4 shows lever 16 and rocker 91 in actuated but not locked position. Figure 5 shows the same parts in actuated and locked position. Figure 6 is a section through the valve itself in a plane parallel to the plane of the paper in Figure 1.

In the drawings the numeral 28 represents generally the three-way valve adapted to control a flow of fluid from an air supply 1 to a mechanism to be operated, generally designated by the number 100. The valve is fastened by screws 130 to flange 291 of casting 10. The valve operating mechanism comprises generally a lever or manual control 2 fixed upon a rotating shaft 3 mounted on the under side of a frame or base 10 and carrying the hub 4 of an arm 5 extending up through opening 15 in base 10 in the outer end of which is a roller 6 journalled upon a pin 7. A spring 8 anchored to a lug 9 upon the frame 10 engages the pin 7 to raise the arm 5 and with it the manual 2.

The valve itself is operated by a lever 16 pivoted upon a stud 17 on the frame 10 in position to be engaged by the roller 6 and urged upwardly by a spring 18 attached to one end at lug 19 upon the lever and at the other end, to lug 9. The lever 16 has a short arm carrying a socket 20 in which there is mounted a plunger 21 urged outwardly by a spring 22 and having a stem 23 extending outwardly through the lower end of the socket and provided with a retaining device 25 to limit the outward motion of the plunger in response to the spring.

The valve 28 is operated by a plunger 27 in position to be engaged by the plunger 21 to operate the valve. The valve itself comprises a casing 24 having an upper chamber 30 and a lower chamber 29 connected by a vertical passageway 31. The lower chamber connects to an exhaust at 32, preferably through a muffler (not shown). The upper chamber 30 communicates with the pressure failure device to be described through a conduit 35 and connects with an air supply through a conduit 1. Midway in the vertical channel 31 is a lateral channel 31a which communicates with the mechanism to be operated upon through a conduit 31b. Within the lower chamber 29 there is provided a valve head 33 carried by the valve stem or plunger 27 and it is constructed in its lowermost position to engage a valve seat 33a to prevent leakage of the motor fluid out past the valve stem 27 and to engage in its upper position a valve seat 33b to shut off the channel 31 from the exhaust altogether. By reason of providing the valve seat 33a, it is not necessary to make the stem 27 fit tightly within its bearings and by reason of this arrangement it is possible to seat the valve head against the seat 33b more easily.

Within the chamber 30 there is provided a second valve head 34 having a vertical stem 34a in position to be engaged by the valve head 33 when the latter is raised. This valve head 34 is constructed and arranged to cooperate with a seat 34b upon the casing 24 to shut off communication between the upper chamber 30 and the channel 31 whenever the valve stem 27 is released. By reason of the fact that the valve stem 34a rests upon but is not attached to the valve head 33, it is possible for the valve head 34 tightly to engage its valve seat 34b by reason of the pressure in the chamber 30 and then to permit the valve head 33 independently to engage the valve seat 33a without either valve holding the other from active engagement with its seat.

The conduit 35 from the valve communicates with the pressure failure device, generally designated at 36, the construction of which is more clearly shown in Figure 3. This pressure failure device is attached by screws 37 to a frame 38 upon the base 10. This pressure failure device comprises generally a diaphragm chamber extending outwardly from which is a longitudinal rod 39 having an upwardly extending hook 40 for the purpose of engaging an operating arm 95 a rocker 91, which will be hereafter described.

The diaphragm chamber comprises a pair of castings 45 and 46 clamped together about a diaphragm 49. The conduit 35 connects through the casting 45 to transmit the pressure of the power main to one side of the diaphragm 49. The rod 39 has on it a head 48 which engages the diaphragm 49, and a spring 47, is housed within the casting 46 and pressing against the head 48, and urges the head against the diaphragm with sufficient pressure to move the arm 95 whenever the fluid pressure against diaphragm 49 falls below the predetermined amount; but this spring is of such strength that when the pressure in the casting 45 becomes sufficient it will overcome the spring and move the turned up portion 40 to the right to disengage or free the arm 95.

The arm 95, as will be described, is connected to mechanism for holding the operated mechanism operated, and the object of this mechanism is to insure the release of the operated mechanism whenever power fails on the line.

The strength of the spring 22 is such that under normal conditions it will overcome the pressure upon the valve 34 to open the valve fully and the movement of the lever 16 in the opposite direction is limited by a stop 41.

The mechanism 100 to be operated upon is here illustrated for convenience as a cylinder 101 in which there is moving a piston 102 against a frame 103. This is shown generically to represent any type of operated mechanism and within the cylinder there is provided a port connected to a conduit 60 leading to a releasing device which will now be described.

Mounted upon the frame 10 is a cylinder 61 in which there moves a piston 62 attached to a piston rod 63 urged inwardly into the cylinder by a spring 64 and adapted to be pressed out of the cylinder by air pressure within the cylinder. Lever 70 is pivoted upon lug 71 upon the frame 10 by a pin 72 and this lever extends through a slot 65 in the piston rod 63 and is held therein by a pin 66 so that as the piston 62 moves into or out of the cylinder 61, the lever 70 is moved about its pivot 72. A rod 75 is slideably mounted in a bearing 74 in the casting and is bifurcated at each end, one end embracing the rod 70 and pivoted to it by a pin 73 and the other end embracing a roller 76 and pivoted to it by a pin 77.

This roller 76 is thus movable along the axis of the rod and in one position it engages the lever 16 to limit the movement thereof, as shown in Figure 4, and in its retracted position it is withdrawn beyond the plane of the lever to permit the lever to complete its movement as shown in Figure 5. With this construction it will be clear that the roller 76 will prevent the complete movement of the lever 16 until the piston 102 has in fact moved far enough to uncover the port of the conduit 60, but as soon as this movement of the piston has been completed to that point, then the operation of the lever 16 may be continued.

The locking and releasing of the mechanism is accomplished by a second manual lever 80 fastened upon a shaft 81 rotatably mounted in the frame and supported by a bracket 82 and by a bearing 83 upon the frame. Fixed upon this shaft 81 is an arm 84 pivotally connected to a link 85, the adjustable bar 86 of which in turn is pivoted to rocker arm 94 by a stud 87. A spring 90 engages the stud 87 and is anchored to a stud upon the main frame to urge the rocker 91 in counter-clockwise direction against stop 88. The rocker generally designated as 91 mounted on stud 92 is provided with three arms, 93, 94, 95, 94 being the arm on which the stud 87 is mounted and 95 being the arm which engages the hook 40 of the rod 39. The arm 93 is bent over, as shown in Figure 1, terminating in a horizontal portion which is capable of catching over the end of the lever 16 to hold it down, as shown in Figure 5, but so disposed that when the rocker arm is oscillated to the point, as shown in Figure 4, the lever 16 will be free. The end of the lever arm 93 is provided with a point 96 and the end of the lever 16 is provided with notches 97 adapted to cooperate with the point 96 so that if the rocker 91 is released, while the valve operating manual 2 is held depressed, the point 96 will engage one of the notches 97 and prevent the further movement of the lever 16 until either the manual 2 is released or the manual 80 depressed.

The operation of the device will be evident from the foregoing description. Let us assume that there is power on the line 1 then, unless the manual 80 is depressed, the manual 2 cannot be moved to open the valve because the arm 93 of rocker 91 lies beneath the lever 16 and obstructs its movement.

If, however, we first depress the manual 80 and then depress the manual 2, the lever arm 16 will assume the position shown in Figure 4, opening the valve 34 and admitting air to the cylinder 101.

If at this point the lever 2 is released, the valve will return and the pressure on the piston 102 will be relieved. If, on the other hand, the manual 80 be released, the rocker arm 91 will assume the position shown in Figure 4 but will be unable to lock the operated mechanism in operated position because the lever 16 has not been depressed far enough for the arm 93 to go over its top.

If, however, we hold both levers depressed until the piston 102 has moved far enough to uncover the port of conduit 60, then the roller 76 is withdrawn out of alignment with the lever 16 whereupon the manual 2 may be further depressed to bring the lever 16 into the position shown in Figure 5 against the compression of the spring 22 and in this position the end of the lever 16 is low enough so that the arm 93 may pass above it and lock it in place. When this position has been reached and the manual 80 has been released, then the manual 2 may also be released and the valve will be held open by the arm 93.

When it is desired to close the valve, the manual 80 may be depressed thereby rocking the rocker 91, releasing the end of the lever 16 and allowing the valves to return to the initial position.

As soon as the pressure is relieved within the cylinder 101 it is also relieved within the cylinder 61 and the piston 62 is returned to its initial position by the spring 64, thereby again projecting the roller 76 into the pathway of lever 16 for the next operation.

If at any time during the operation, the pressure on the power line fails, then the diaphragm 49 yields to the pressure of the spring 47 (see Figure 3) and the hook 40, acting on the arm 95, rotates the rocker 91 in the position to release the lever 16.

As thus described, if the manual 80 be held depressed, the rate of movement and degree of movement of the operated mechanism may be completely controlled by the manual 2, permitting a very delicate adjustment without any necessity of adjusting both hands. If, however, through any error the manual 80 is released, the locking mechanism will interfere with any operation of the operated mechanism or even the completion of said operation, if it be only partially completed until the manual 80 is again depressed.

The device 100 in the drawings represents any type of receiving system into which it may be desired to control the flow of air, such for example, as a branch of an air supply system or any type of a machine which it may be desired to operate, and the control line 60 is intended generically to represent any response to the condition within the receiving system. If, for example, the device be used to feed air into a branch air supply system or the like, the conduit 60 may be connected direct to such system to operate the roller 76 as soon as a predetermined pressure has been built up within the system.

Such receiving system forms no part of the present invention and the illustration to that extent is symbolic only.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A device for controlling the flow of fluid to a receiving system comprising a three-way valve, having an open position that admits fluid to the system and a closed position that permits the exhaust of fluid therefrom, means including a valve operating element and a catch, for operating said valve and means responsive to a condition in the receiving system for conditioning said catch to hold said valve open only after the flow of fluid has produced a predetermined condition within said system, and manual means for releasing said catch.

2. A device according to claim 1, in which the valve operating means comprises also a lever for operating the valve, and said catch engages said lever to hold the valve open.

3. A device according to claim 1 in which the means for conditioning the catch comprises means for obstructing the engagement between the catch and valve operating element, and means for withdrawing the obstructing means in response to said predetermined condition.

4. A device according to claim 1 in which the valve operating element comprises a valve operating lever movable to a position to open said valve and movable further, means for obstructing said further movement, and the system responsive means includes means for rendering said obstructing means inactive to permit said further movement when the predetermined condition is reached, and said catch is constructed and arranged to engage said lever only after said further movement.

5. A device according to claim 4 in which the valve comprises a valve head which seats against a port to close the exhaust on operation of said lever and which is connected to said lever by a resilient connection, whereby said lever is capable of said further movement.

6. A device for controlling the flow of fluid to a receiving system comprising a valve having an open position that admits fluid to the system, a manual for operating said valve, means for holding said valve in open position and means for releasing said valve, including power operated means for preventing said holding means from functioning, whereby said valve is released on any failure in the power supply.

7. A device according to claim 6 in which the releasing means comprises an element, spring held in one direction to release the valve holding means, and is provided with a diaphragm chamber connected to the power supply having a diaphragm constructed and arranged to engage said spring held member to overcome the action of said spring to prevent release of said member.

8. A device of the character described comprising a valve movable to an open position to admit fluid to a receiving system, a lever for operating said valve to said position, a manual for engaging said lever to move the same to open the valve, a catch constructed and arranged to engage said lever to hold the same in position at either extreme of its movement, means responsive to the condition within the receiving system for obstructing the movement of said lever before it reaches its extreme position in the open valve direction and before it is in position to be engaged by said catch and constructed and arranged to withdraw said obstructing means to permit the continued operation of said lever when a predetermined condition within the receiving system has been attained and manual means for withdrawing said catch.

9. A device in accordance with claim 8 in which the obstructing means comprising a roller is movable transverse to the plane of movement of the lever and spring held in the plane of said lever and a diaphragm chamber having a diaphragm responsive to pressure from said receiving system for overcoming the action of said spring to withdraw said roller.

10. A device in accordance with claim 8 includes a spring operated means for releasing said catch and a diaphragm chamber connected to the power supply and having a diaphragm constructed and arranged to engage said spring held member to prevent release of said catch.

HARRY E. KOEPCKE.